United States Patent [19]
Wehrlen

[11] Patent Number: 5,994,794
[45] Date of Patent: Nov. 30, 1999

[54] METHODS AND APPARATUS FOR PROVIDING PROTECTION TO BATTERIES IN AN UNINTERRUPTIBLE POWER SUPPLY

[75] Inventor: David J. Wehrlen, Austin, Tex.

[73] Assignee: Active Power, Inc., Austin, Tex.

[21] Appl. No.: 08/853,751

[22] Filed: May 9, 1997

[51] Int. Cl.$^6$ ....................................................... H02J 9/08
[52] U.S. Cl. ............................... 307/66; 307/64; 307/67; 307/68; 322/4
[58] Field of Search .................................. 307/66, 64, 67, 307/68; 322/4

[56] References Cited

U.S. PATENT DOCUMENTS

| | | | |
|---|---|---|---|
| 4,412,170 | 10/1983 | Roesel | 307/64 |
| 4,439,720 | 3/1984 | Georges | 322/4 |
| 4,686,375 | 8/1987 | Gottfried | 307/64 |
| 4,707,774 | 11/1987 | Kajita | 307/66 |
| 4,827,152 | 5/1989 | Farkas | 307/68 |
| 5,126,585 | 6/1992 | Boys . | |
| 5,229,650 | 7/1993 | Kita et al. . | |
| 5,295,078 | 3/1994 | Stich et al. . | |
| 5,384,792 | 1/1995 | Hirachi . | |

OTHER PUBLICATIONS

G. E. Comeau, "Mechanical and Battery–Stored Energy systems for Meeting Uninterruptible and Buffer Electric Power Needs," *IEEE Trans. on Indust. Applications*, vol. 1a–10, No. 2, Mar. 1974.

J. Sachau, "Isolated Grid Formation With Permanently–Excited Synchronous Generator Fed By A Pulse Inverter," *Proc. of the European Conference on Power Electronics and Applications*, vol. 2, No. conf. 3, Oct. 9, 1989.

H. C. Lengefeld, "Rotary UPS–More Reliable For New Computers," *Computer Tech. Review*, vol. 9, No. 16, Jan. 1, 1990.

French Publication No. 2 390 844.

*Primary Examiner*—Albert W. Paladini
*Attorney, Agent, or Firm*—Fish & Neave; Robert W. Morris

[57] ABSTRACT

An uninterruptible power supply (UPS) provides improved reliability by extending the useful life of a bank of batteries that provide backup power to the UPS in the event of an extended power outage. In the preferred embodiment, battery life is extended by switchably isolating the bank of batteries from the DC buss that is coupled to the critical load. Backup power for short duration outages, on the order of about ten seconds or less, is provided by a flywheel energy storage unit. Once the outage becomes extended, the isolation circuit is triggered to electrically connect the bank of batteries directly to the DC buss. In this manner, the bank of batteries does not experience AC ripple or the common, short duration outages that would otherwise cause the batteries to experience a discharge/recharge cycle.

27 Claims, 4 Drawing Sheets

METHODS AND APPARATUS FOR PROVIDING PROTECTION TO BATTERIES IN AN UNINTERRUPTIBLE POWER SUPPLY

BACKGROUND OF THE INVENTION

This invention relates to uninterruptible power supply (UPS) systems, and more particularly toward UPS systems that include batteries such as conventional lead-acid batteries as a standby power source.

UPS systems are often installed in environments in which continuous operation is critical, even in the event of a loss of main power. For example, such systems may be installed in airports, hospitals, processing plants and computer centers. In each case, a total loss of power may lead to catastrophic results (e.g., a loss of power in the middle of surgery may result in the death of the patient).

In typical UPS systems, circuitry is provided that monitors power being supplied from a main source of power, often via a connection to a DC buss. A bank of batteries, often lead-acid batteries, is connected to a DC buss that feeds the critical load to provide temporary power as soon as the voltage on the buss drops below battery voltage. The batteries are usually intended to provide temporary power only until a standby power source such as a backup diesel generator ("GENSET") can be brought on-line, or in some instances, are the sole backup power source (e.g., providing enough backup power to permit a normal, sequential shutdown of a processing system). The batteries, therefore, typically provide power for a very short time, until the standby generator is running at full speed and providing backup power.

One deficiency of traditional battery based UPS systems is that the battery life is often significantly reduced due to power disturbances that are very short in duration (e.g., less than a few seconds). It is generally known that approximately ninety percent of the power disturbances that occur are of the very short duration type (for example, some installations are known to have very short duration outages which occur hundreds of times each month). These short duration outages, however, still cause the line voltage to sag, leading to the batteries experiencing a discharge/charge cycle for each outage. The life of the batteries, as is well known, is inversely proportional to the number of discharge/charge cycles that the batteries are subjected to. Thus, even very short duration outages may have a severe negative impact on battery life. Moreover, it is also known that AC ripple is present on the DC buss that the batteries are connected to. This ripple further accelerates the loss of useful life of the batteries.

In view of the foregoing, it is an object of the present invention to provide an improved uninterruptible power supply in which batteries are protected from electrical disturbances that artificially reduce battery life.

It is also an object of the present invention to provide an improved method of supplying battery power to an uninterruptible power supply so that useful battery life is extended over conventional supplies.

SUMMARY OF THE INVENTION

These and other objects of the invention are accomplished in accordance with the principles of the invention by providing an uninterruptible power supply in which the batteries of the backup power source are electrically isolated from the supply unless a long duration outage occurs. The preferred embodiments isolate the batteries by utilizing a flywheel energy storage device to provide temporary power during very short duration outages. Additional circuitry is provided that brings the batteries "on-line" when longer outages are experienced.

The flywheel energy storage device, which is electrically coupled to the DC buss, is activated by a monitoring circuit whenever a main power fault is detected, regardless of the duration. As long as the duration does not exceed a preset value (i.e., a very short duration, such as a few seconds), the flywheel provides an alternate source of power until the utility line power is once again stable. If, however, the duration exceeds a very short duration, for example, greater than approximately ten or fifteen seconds, the monitoring circuit sends a signal to the isolation circuitry that brings the batteries on-line. The monitoring circuitry may also send a signal to bring a GENSET on-line for extended outages.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
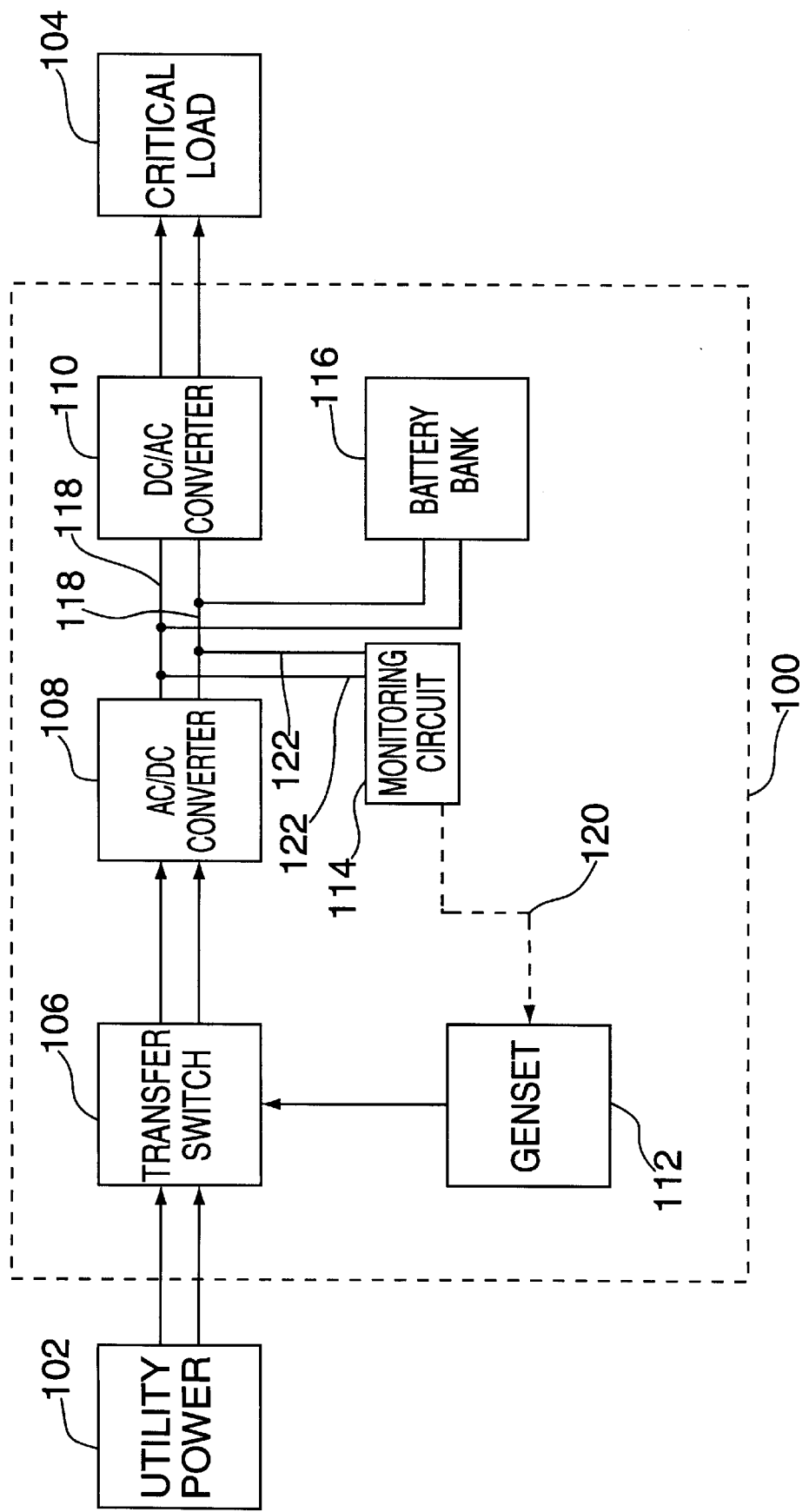
FIG. 1 is a block diagram of a conventional battery powered uninterruptible power supply.

FIG. 1 shows a conventional GENSET-backed battery powered uninterruptible power supply 100 (UPS 100). UPS 100 is connected between utility power source 102, which may simply be power supplied from a utility company, and critical load 104. Critical load 104 represents any one of several different applications in which a continuous supply of power is critical, such as the aforementioned airport, hospital, etc. UPS 100 provides backup power to critical load 104 in the event that utility power source 102 fails.

UPS 100 includes a transfer switch 106, an AC-to-DC converter 108, a DC-to-AC converter 110, a GENSET 112, a monitoring circuit 114, and a battery bank 116 (which may include a bank of, for example, lead-acid batteries). Transfer switch 106 transfers the power supply from utility power source 102 to GENSET 112 after utility source 102 fails and GENSET 112 is providing power at a sufficient level. AC-to-DC converter 108 takes the AC power provided by either utility power source 102 or GENSET 112 and converts it to DC power. Converter 108 may be a simple rectifier circuit, or it may be any other conventional circuit that is used to convert power from AC to DC as long as the proper power levels are maintained. This is typically accomplished by providing DC to DC buss 118 at a level of approximately 480 volts. The DC power is fed across DC buss 118 to DC-to-AC converter 110, which converts it back to AC power. Converter 110 may be a simple inverter circuit, or it may be any other conventional circuit used to convert power from DC to AC.

DC buss 118 is monitored by monitoring circuit 114 through lines 122 (while monitoring circuit 114 is only shown to receive signals indicative of the status of DC buss 118, additional "utility power failure" input signals may be received by monitoring the input to AC-to-DC converter 108 and/or the output from DC-to-AC converter 110). Once a utility power failure has been detected, monitoring circuit 114 sends signals along line 120 that may cause backup power to be supplied to critical load 104 from GENSET 112. Battery bank 116 supplies DC power to DC buss 118 as soon as the voltage on DC buss 118 drops below battery voltage. Battery bank 116 continues to supply power to buss 118 until either the batteries are drained or until adequate power is being supplied to critical load 104 from another source (i.e., either utility power source 102 or GENSET 112—a signal on line 120 triggers GENSET 112 to begin a powerup cycle). As soon as the voltage on DC buss 118 exceeds the voltage of battery bank 116, battery bank 116 ceases to discharge and instead, begins recharging.

Figure 2:
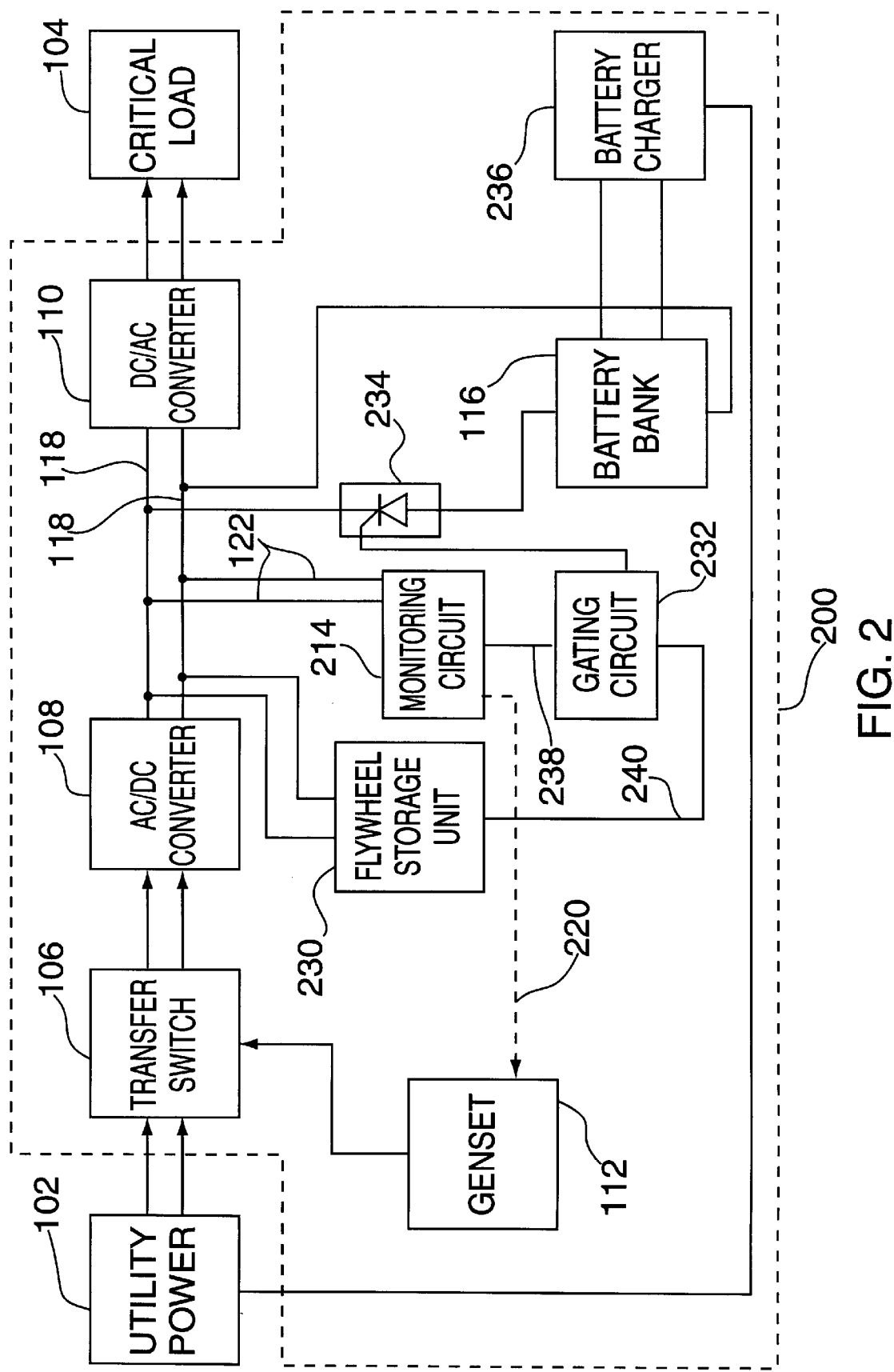
FIG. 2 is a block diagram of a flywheel/battery backed uninterruptible power supply constructed in accordance with the principles of the present invention.

FIG. 2 shows a battery-backed uninterruptible power supply 200 (UPS 200) that, in accordance with the principles of the present invention, overcomes the deficiencies of conventional battery-backed UPS systems. UPS 200 includes many of the same components as UPS 100. For example, transfer switch 106, AC-to-DC converter 108, DC-to-AC converter 110, GENSET 112 and battery bank 116. The monitoring circuit is shown as monitoring circuit 214 in view of the fact that different control signals are required in UPS 200 (e.g., the signal sent from monitoring circuit 214 to gating circuit 232 described below). UPS 200 also includes flywheel storage unit 230 (flywheel unit 230 includes, for example, a flywheel rotor (not shown), a motor/generator assembly (not shown), and an electronics control module (not shown) for normal operation), gating circuit 232, isolation circuit 234 (which may be a solid-state switch such as an SCR, as shown) and battery charger 236. Isolation circuit 234 keeps battery bank 116 disconnected from buss 118 until battery bank 116 is needed to supply power to buss 118. This protects battery bank 116 from the degradation in useful life that would otherwise occur due to the AC ripple present on buss 118.

UPS 200 normally operates in a monitoring mode, whereby monitoring circuit 214 monitors DC buss 118 until the voltage on buss 118 drops below a predetermined threshold (as described above, monitoring circuit 214 may also be activated by sensor inputs at either the input to AC-to-DC converter 108, the output to DC-to-AC converter 110, or both). If utility power 102 experiences a short duration outage (e.g., on the order of about 10 seconds or less), flywheel storage unit 230 provides DC energy to buss 118 so that buss 118 remains above the predetermined threshold. While utility power 102 is operating normally, flywheel unit 230 siphons off a small amount of power to overcome its internal losses and maintain its rotational speed.

If flywheel unit 230 determines that an extended outage occurs (i.e., after a predetermined amount of time has passed after the outage began), then flywheel unit 230 sends a trigger signal to gating circuit 232 via line 240. Additional reliability is provided by monitoring circuit 214, which detects an extended outage when the voltage on buss 118 drops below the predetermined voltage (e.g., if the trigger signal on line 240 fails to occur). Monitoring circuit 214, if required, sends a trigger signal via line 238 to gating circuit 232.

The trigger signals cause gating circuit 232 to switch isolation circuit 234 (i.e., the solid-state switch) out of isolation to bring battery bank 116 on-line. This provides temporary power to buss 118 until GENSET 112 is up and running or utility power is restored. Of course, the principles of the present invention may be practiced without the inclusion of GENSET 112. Under such circumstances, battery bank 116 provides backup power until they are depleted, in which case, all critical systems should have been powered down in an orderly fashion. GENSET 112 is activated by monitoring circuit 214 via a trigger signal on line 220 that is generated at about the same time as the trigger signal on line 238. Once GENSET 112 is producing power at the proper level, transfer switch 106 transfers the input power from utility power source 102 to GENSET 112 and battery bank 116 and energy storage system 230 cease to provide power to DC buss 118. Once utility power is restored, utility power reenergizes the flywheel unit 230 and supplies power to battery charger 236 to charge battery bank 116 (battery charger 236 typically provides a low ripple trickle charge signal to battery bank 116 to minimize the negative effects on the batteries).

UPS 200 provides many advantages over known UPS systems in extending battery life. UPS 200, however, may not provide the level of reliability required by some installations. For example, because UPS 200 includes only one monitoring circuit, one gating circuit and one isolation circuit, UPS 200 may experience a single point failure if any of those three components fails (e.g., if isolation circuit 234 fails, battery bank 116 will not come on-line). It is known that some installations require power systems to be redundant so that no single point failure can bring down the system. This potential problem is overcome by UPS 300 shown in FIG. 3. Additionally, while both UPS 200 and UPS 300 are shown to include GENSET 112, the inclusion of GENSET 112 is not to be considered a limitation of the present invention, as UPS 200 and UPS 300 may both be implemented without GENSET 112, as described above.

Figure 3:
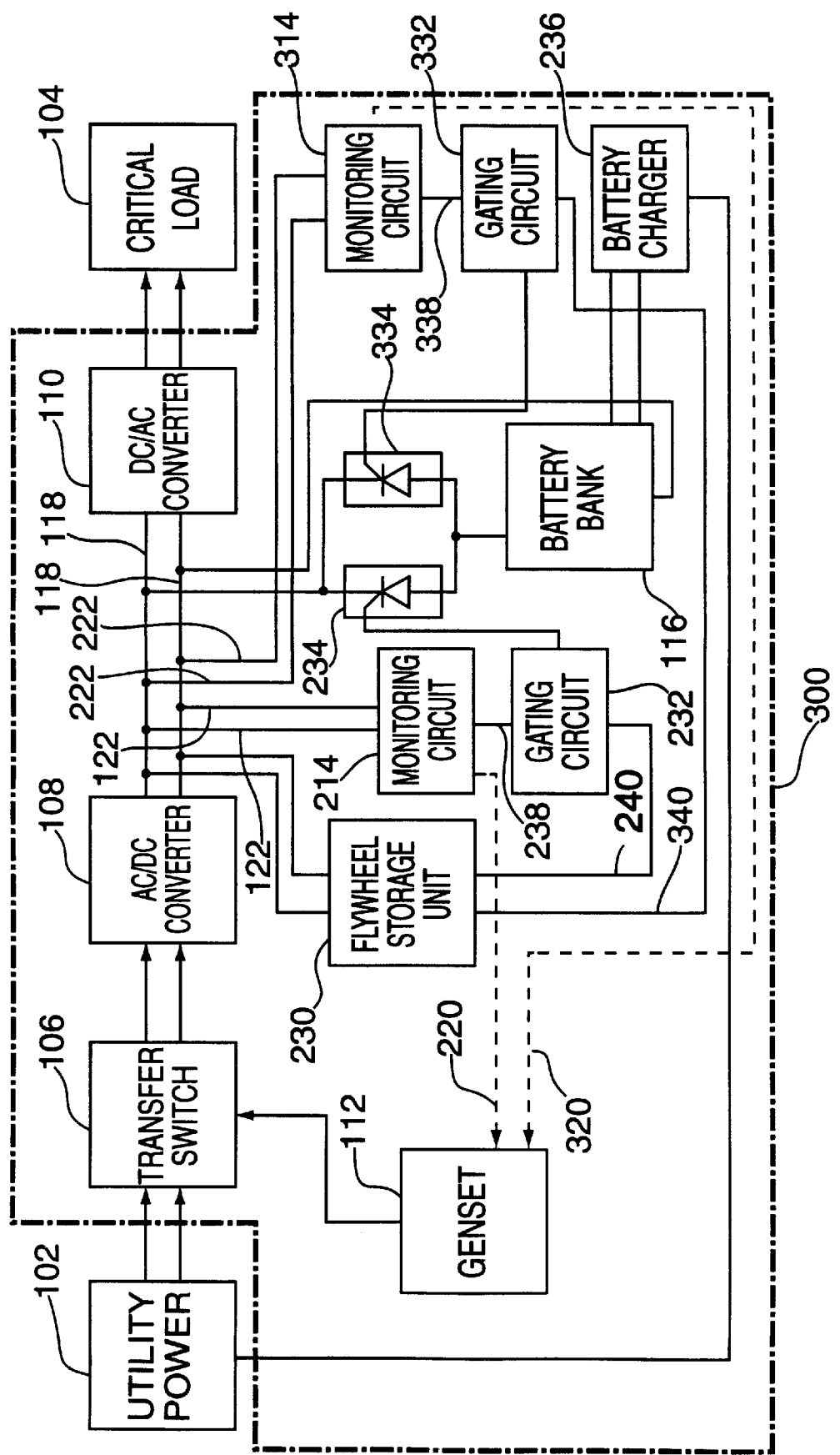
FIG. 3 is a block diagram of a flywheel/battery backed uninterruptible power supply constructed in accordance with the principles of the present invention including redundant isolation circuitry.

FIG. 3 shows a representative example of modifications that may be made to UPS 200 of FIG. 2 to provide all of the advantages of the present invention in a redundant configuration. Persons skilled in the art will understand that various modifications, other than those shown in FIG. 3 may be made without departing from the spirit of the present invention. For example, as described below, UPS 300 includes a pair of monitoring circuits, a pair of gating circuits and a pair of isolation circuits. Additional redundancy may be provided by adding a second flywheel storage unit to the UPS, even though such a configuration is not shown.

UPS 300 is similar to UPS 200 of FIG. 2, and as such, many components are numbered using the same or similar numbering scheme. For example, UPS 200 and UPS 300 both include converters 108 and 110. Additionally, each component added for redundancy is numbered using the same two-digit suffix as in FIG. 2 (e.g., the additional monitoring circuit in FIG. 3 is labeled as monitoring circuit 314 versus monitoring circuit 214 of FIG. 2). UPS 300 includes redundant monitoring circuit 314, redundant gating circuit 332 and redundant isolation circuit 334. Isolation circuits 234 and 334 are coupled together in parallel and sized such that either circuit can handle the entire load of battery bank 116. A second trigger line 340 is provided from flywheel unit 230 to gating circuit 332, and a second trigger line to GENSET 112 to provided via line 320 from monitoring circuit 314.

UPS 300 operates in substantially the same manner as UPS 200. Short duration outages are compensated for by flywheel unit 230, which maintains buss 118 above the predetermined voltage. If flywheel unit 230 determines that an outage is extended, trigger signals are sent via lines 240 and 340 to gating circuits 232 and 332, respectively. If flywheel unit 230 fails to generate the trigger signals, the extended outage will be detected by at least one of monitoring circuits 214 and 314 when the voltage on buss 118 falls below the predetermined level, in which case trigger signals on lines 220 and 238, and 320 and 338 are generated by monitoring circuits 214 and 314, respectively. Once gating circuits 232 and 332 receive trigger signals, they activate isolation circuits 234 and 334, respectively, to bring battery bank 116 on-line. In the configuration shown in FIG. 3, no single point of failure can "bring down the system," while battery bank 116 remains isolated from buss 118 until it is needed. Additional redundancy may also be provided by including one or more supplemental flywheel units (not shown).

Figure 4:
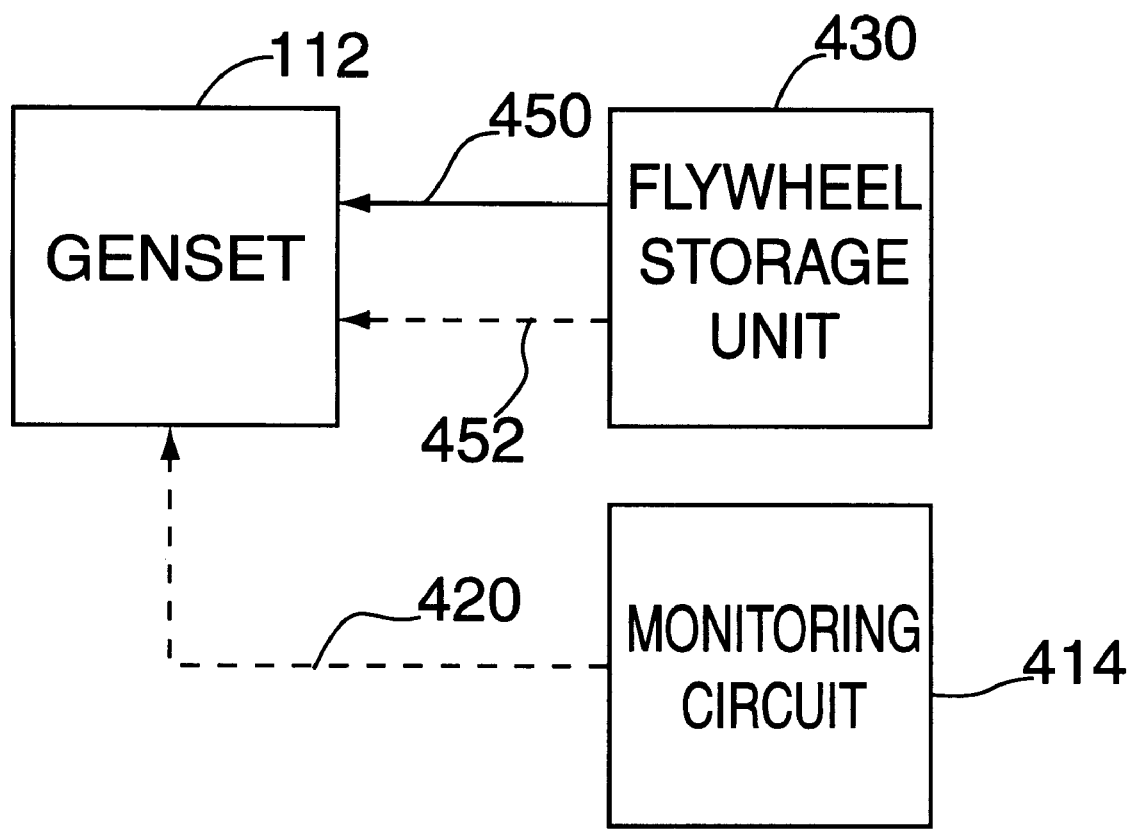
FIG. 4 is a block diagram of modified configuration of the flywheel/battery backed uninterruptible power supplies of FIGS. 2 and 3 constructed in accordance with the principles of the present invention.

FIG. 4 shows additional modifications that may be made to either UPS 200 or UPS 300 of FIGS. 2 and 3, respectively, in accordance with the principles of the present invention. The modifications shown in FIG. 4 enable the UPS system to further reduce the reliance on battery bank 116 to improve overall system reliability. Replacing flywheel unit 230 with flywheel unit 430 provides a direct line 452 to activate GENSET 112 from flywheel unit 430. Flywheel unit 430 may activate GENSET 112 at a point in time prior to the identification of an extended outage (e.g., less than about ten seconds) so that GENSET 112 may come on-line prior to battery bank 116 being required to do so. Under such circumstances, battery bank 116 becomes essentially an "insurance policy" that should never be required to provide power during outages. Moreover, redundancy is maintained by line(s) 420 (representing line 220 in FIG. 2 and lines 220 and 320 in FIG. 3) that provide additional trigger signals to GENSET 112. A further optional modification that may be made, is to provide a tap from flywheel unit 430 to GENSET 112 via line 450 through which startup power is supplied from flywheel unit 430 to GENSET 112 (in which case, trigger line 452 may not be required).

It will be understood that the foregoing is only illustrative of the principles of the invention, and that various modifications can be made by those skilled in the art without departing from the scope and spirit of the invention.

I claim:

1. An uninterruptible power supply for providing continuous power to a critical load, said uninterruptible power supply comprising:
    an AC-to-DC converter circuit having an input coupled to a source of primary power, and an output;
    a DC-to-AC converter circuit having an input coupled to said output of said AC-to-DC converter circuit to form a DC buss, and an output;
    a battery bank;
    a first monitoring circuit that monitors for an extended outage of primary power;
    a flywheel energy storage unit electrically coupled to said DC buss, said flywheel unit providing power in the event of short duration outages of primary power; and
    a first isolation circuit coupled to receive information from said first monitoring circuit regarding status of primary power, said first isolation circuit being coupled between said battery bank and said DC buss, said first isolation circuit being triggered to switch out of isolation when said extended outage of primary power is detected so that said battery bank is then directly coupled to said DC buss to provide power to said buss.

2. The uninterruptible power supply of claim 1 further comprising a battery charger coupled to said battery bank and to said source of primary power.

3. The uninterruptible power supply of claim 1, wherein said first monitoring circuit monitors said DC buss.

4. The uninterruptible power supply of claim 1, wherein said first monitoring circuit monitors said input of said AC-to-DC converter.

5. The uninterruptible power supply of claim 1, wherein said first monitoring circuit monitors said output of said DC-to-AC converter.

6. The uninterruptible power supply of claim 1 further comprising:
    a transfer switch coupled to said source of primary power, said transfer switch having an output;
    a GENSET electrically coupled to said transfer switch and to said first monitoring circuit, said GENSET being capable of providing replacement power to said critical load in the event of an extended outage.

7. The uninterruptible power supply of claim 6, wherein said GENSET is activated by a GENSET trigger signal from said first monitoring circuit.

8. The uninterruptible power supply of claim 6, wherein said GENSET is activated by a GENSET trigger signal from said flywheel unit.

9. The uninterruptible power supply of claim 1 further comprising:
    a first gating circuit coupled to said first isolation circuit, said first gating circuit triggering said first isolation circuit to switch out of isolation upon the receipt of a first trigger signal.

10. The uninterruptible power supply of claim 9, wherein said first trigger signal is provided to said first gating circuit by said flywheel unit.

11. The uninterruptible power supply of claim 9, wherein said first trigger signal is provided to said first gating circuit by said first monitoring circuit.

12. The uninterruptible power supply of claim 9, wherein said first monitoring circuit monitors the voltage of said DC buss and determines that said extended outage has occurred when said voltage falls below a predetermined level.

13. The uninterruptible power supply of claim 12, wherein said flywheel unit maintains the voltage on said DC buss at least equal to said predetermined level during said short duration outage.

14. The uninterruptible power supply of claim 9 further comprising:
    a second monitoring circuit coupled to said DC buss that monitors said DC buss for an extended outage of primary power;
    a second isolation circuit coupled between said battery bank and said DC buss, said second isolation circuit being triggered to switch out of isolation when said extended outage of primary power is detected so that said battery bank is then directly coupled to said DC buss to provide power to said buss; and
    a second gating circuit coupled to said second isolation circuit, said second gating circuit triggering said second isolation circuit to switch out of isolation upon the receipt of a second trigger signal.

15. The uninterruptible power supply of claim 14, wherein said second trigger signal is provided to said second gating circuit by said flywheel unit.

16. The uninterruptible power supply of claim 14, wherein said second trigger signal is provided to said second gating circuit by said second monitoring circuit.

17. The uninterruptible power supply of claim 14 further comprising:
    a transfer switch coupled to said source of primary power, said transfer switch having an output;

a GENSET electrically coupled to said transfer switch and to said second monitoring circuit, said GENSET being capable of providing replacement power to said critical load in the event of an extended outage.

18. A method of extending useful life of a bank of batteries in an uninterruptible power supply, said method comprising the steps of:

converting AC power from a primary source to DC power;

outputting said DC power to a DC buss;

monitoring the voltage level of power in said uninterruptible power supply with a first monitoring circuit;

providing backup power to said DC buss from a flywheel storage unit in the event of a short duration loss of power from said primary source;

coupling a first switchable isolation circuit between said bank of batteries and said DC buss; and triggering said first isolation circuit to couple said bank of batteries to said DC buss in the event of an extended loss of power from said primary source.

19. The method of claim 18, wherein said step of triggering is performed by a first trigger signal produced by said flywheel unit.

20. The method of claim 18, wherein said step of triggering is performed by a first trigger signal produced by said first monitoring circuit.

21. The method of claim 18 further comprising the step of:

recharging said bank of batteries by coupling a low ripple battery charger between said primary power source and said bank of batteries.

22. The method of claim 18, wherein said step of monitoring monitors power on said DC buss.

23. The method of claim 18, wherein said step of monitoring monitors power from said power source.

24. The method of claim 18, wherein said step of triggering comprises the steps of:

providing a first trigger signal to a first gating circuit;

producing a first switch signal in response to said first trigger signal; and switching said first isolation circuit in response to said produced first switch signal.

25. The method of claim 24, further comprising the steps of:

monitoring the voltage level of said DC buss with a second monitoring circuit;

coupling a second switchable isolation circuit between said bank of batteries and said DC buss; and triggering said second isolation circuit to couple said bank of batteries to said DC buss in the event of an extended loss of power from said primary source, such that, in the event of an extended loss of power, one of said first and second isolation circuits couple said bank of batteries to said DC buss.

26. The method of claim 18 further comprising the steps of:

providing an alternate source of AC power in said step of converting, said alternate AC power being provided by a GENSET, said GENSET being capable of providing replacement power to said critical load in the event of an extended outage; and electrically coupling said GENSET to at least one of said flywheel unit and said first monitoring circuit to provide an activation signal to said GENSET.

27. The method of claim 26, wherein said step of coupling said GENSET comprises the steps of:

coupling said GENSET to said flywheel unit; and tapping power from said flywheel unit to provide startup power to said GENSET.

* * * * *